Dec. 18, 1962     L. S. JAWORSKI     3,068,540
SHEET METAL SCREW FASTENER
Filed Dec. 18, 1959
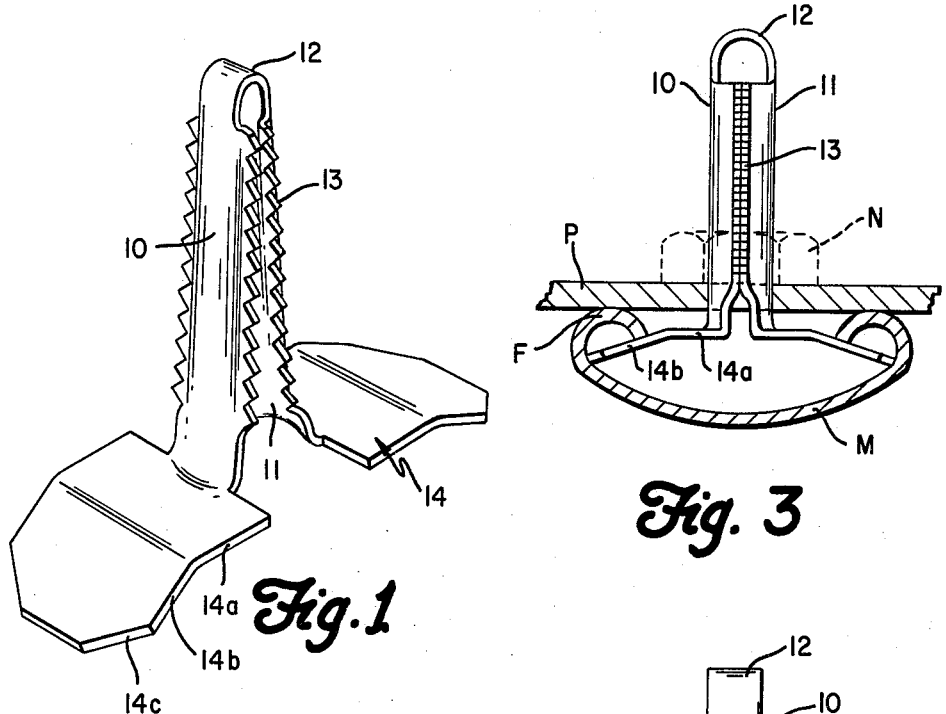
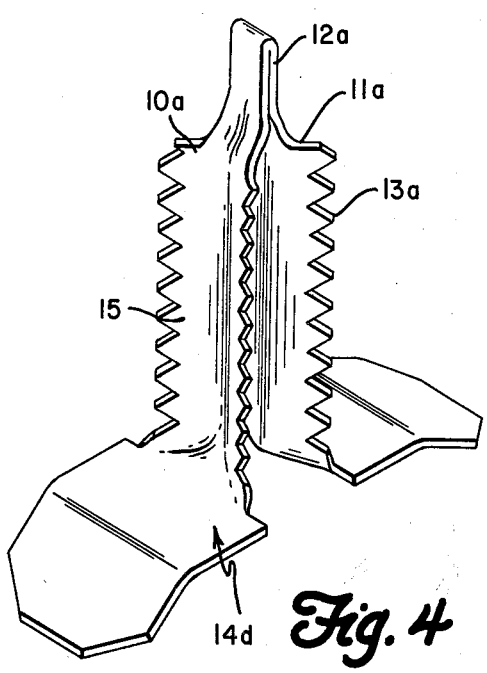
INVENTOR.
LEONARD S. JAWORSKI
ATTORNEY

3,068,540
SHEET METAL SCREW FASTENER

Leonard S. Jaworski, Toledo, Ohio, assignor, by mesne assignments, to The Bishop and Babcock Corporation, Cleveland, Ohio, a corporation of Ohio
Filed Dec. 18, 1959, Ser. No. 860,458
1 Claim. (Cl. 24—73)

This invention relates to fasteners but more particularly to sheet metal fasteners adapted for nut reception in which the screw threads are formed by teeth in the free edges of ports in such manner that they cooperate for thread engagement. It is an object to produce a new and improved sheet metal fastener of this type from a single piece of sheet metal and shaped to provide in effect a screw threaded shank having a head, which conveniently may serve as a molding engaging portion, whereby a molding strip may be readily mounted on a supporting panel in a secure and reliable fashion.

Other objects and advantages of the invention will hereinafter appear, and for purposes of illustration but not of limitation, embodiments of the invention are shown on the accompanying drawings, in which FIGURE 1 is a perspective elevation of a molding fastener embodying the invention;

FIGURE 2 is an end elevation of the molding fastener shown in FIGURE 1;

FIGURE 3 is a sectional elevation showing the molding fastener mounted on a supporting panel and engaged by a molding strip; and FIGURE 4 is a perspective elevation of an alternate form of molding fastener.

The illustrated embodiment of the invention comprises a molding clip or fastener constructed of spring sheet metal and, as shown, consists of a pair of generally parallel elongate relatively narrow arms 10 and 11 which are integrally joined at one end by an arcuate end portion 12. Throughout its length each arm is curved or arched outwardly so that when the two arms are brought into engagement a substantially cylindrical form is provided. Extending from the opposite edges of each of the arms 10 and 11 are flat portions formed with rows of teeth 13 which may be stamped from the metal, these teeth being so arranged as to provide screw threads for threadedly engaging a nut N as indicated on FIGURE 3. Normally the arms slightly taper outwardly from top to bottom so that when the two arms are forced or pressed toward each other, the flat teeth-carrying edge portions are forced flatwise into engagement. When the arms are pressed together, a spring action is created causing the teeth to impinge and frictionally engage the threads on the nut.

The lower end portion of each of the arms 10 and 11 is free of teeth and at the extreme end of each arm is an integral base flange 14 which extends approximately at right angles to the respective arm. Each base flange 14 is formed with a flat portion 14a which terminates in a downwardly and outwardly inclined portion 14b, the corners 14c of which are trimmed off.

As shown in FIGURE 3, the fastener may be inserted through an aperture in a supporting panel P so that a nut N may engage the teeth 13 and be screwed up against the adjacent side of the panel. The base flanges 14 are disposed on the opposite side of the panel so that the inclined end portions 14b angle outwardly away from the adjacent side of the panel P, thereby enabling a molding strip M to be applied thereto, the molding strip having edge flanges F such that the end portions 14b may engage therewith in the manner indicated.

In the modified form shown in FIGURE 4, it will be noted that the upper ends of the generally parallel arms 10a and 11a are joined by an integral portion 12a, the side portions of which are in flat abutting relation. The arms 10a and 11a are disposed similarly to the arms 10 and 11 above described and slightly flare outwardly from the top to the bottom. In this form each of the arms is bent along a central longitudinal line to provide oppositely inclined portions 15 which incline outwardly from the central portion, thereby providing a generally V-shaped structure. On the edges of each of the arms, teeth 13a are stamped, these being arranged also to provide screw-thread engaging portions, so that a nut can be threaded over the fastener. By arranging the teeth 13a in this fashion, a greater area of the nut is engaged. The base flanges on the lower ends of the arms 10a and 11a, as indicated at 14d, are similar to the base flanges 14 above described.

From the above description, it will be manifest that I have produced an exceedingly simple and unique fastener which lends itself to efficient manufacture from sheet metal by stamping operations, it being understood that the structure can be made from a single sheet metal piece. The teeth which form the threads can be readily stamped from the metal, thus substantially reducing manufacturing cost. Other forms of fasteners may be produced embodying the novel features and characteristics herein described.

Numerous changes in details of construction and arrangement may be effected without departing from the spirit of the invention, especially as defined in the appended claim.

What I claim is:

A sheet metal fastener for retaining a molding strip or the like to a panel comprised of a unitary structure having a pair of spaced arms, a spring section integrally and resiliently connecting the end of one of said arms to the respective end of the other of said arms, said spring section tending to normally bias the opposite ends of said arms away from one another, a row of outwardly extending teeth formed on each of the side edges of each of said arms and arranged for screw threaded engagement with a nut or the like, said rows of teeth on each of said arms being generally parallel with respect to one another, each arm being arcuate so that when said two arms are in contact a cylindrical form is produced with said teeth projecting laterally beyond the walls thereof and said teeth of one of said arms abutting those of the other of said arms, and an integral head on the free end of each of said arms for engagement with a molding strip, said heads extending outwardly and away from one another.

References Cited in the file of this patent

UNITED STATES PATENTS

| | | |
|---|---|---|
| 775,812 | Fairbanks | Nov. 22, 1904 |
| 1,110,495 | Kobert | Sept. 15, 1914 |
| 1,506,465 | Wall | Aug. 26, 1924 |
| 2,000,241 | Mangin | May 7, 1935 |
| 2,329,744 | Clarke | Sept. 21, 1943 |
| 2,560,961 | Knohl | July 17, 1951 |
| 2,564,638 | Churchill | Aug. 14, 1951 |
| 2,618,824 | Poupitch | Nov. 25, 1952 |

OTHER REFERENCES

Larrick: Blind Fastener, RCA TN No. 27 in RCA Technical Notes, Radio Corporation of America, RCA Laboratories, Princeton, New Jersey, TK 6554.R2t, published August 7, 1957, issue #1.